(12) United States Patent
Eremenko et al.

(10) Patent No.: US 9,674,320 B2
(45) Date of Patent: Jun. 6, 2017

(54) SYSTEMS AND METHODS FOR ENABLING RADIO-FREQUENCY COMMUNICATION OF A MODULAR MOBILE ELECTRONIC DEVICE

(71) Applicant: Google Inc., Mountain View, CA (US)

(72) Inventors: Paul Eremenko, San Jose, CA (US); David Nathaniel Fishman, San Jose, CA (US); Derek Linden, Ashburn, VA (US); Seth Newburg, Arlington, MA (US); Ara N. Knaian, Newton, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/834,236

(22) Filed: Aug. 24, 2015

(65) Prior Publication Data
US 2016/0057260 A1     Feb. 25, 2016

Related U.S. Application Data

(60) Provisional application No. 62/040,876, filed on Aug. 22, 2014.

(51) Int. Cl.
| | |
|---|---|
| *H04M 1/02* | (2006.01) |
| *H01Q 1/24* | (2006.01) |
| *H01Q 21/28* | (2006.01) |
| *H04B 1/3888* | (2015.01) |
| *H01Q 9/28* | (2006.01) |

(52) U.S. Cl.
CPC .......... *H04M 1/0256* (2013.01); *H01Q 1/243* (2013.01); *H01Q 21/28* (2013.01); *H01Q 9/285* (2013.01); *H04B 1/3888* (2013.01)

(58) Field of Classification Search
CPC ................ H04M 1/0254; H04M 1/0206
USPC .................. 455/551, 556.1, 557, 558
See application file for complete search history.

(56) References Cited

U.S. PATENT DOCUMENTS

| | | |
|---|---|---|
| 4,658,333 A | 4/1987 | Grimes |
| 4,856,088 A | 8/1989 | Oliwa et al. |
| 4,904,549 A | 2/1990 | Goodwin et al. |
| 4,974,317 A | 12/1990 | Rodriguez, II et al. |
| 5,895,230 A | 4/1999 | Bartley |
| 5,983,303 A | 11/1999 | Sheafor et al. |
| 6,114,986 A * | 9/2000 | Cassen ............ G01S 7/03 342/175 |
| 6,862,173 B1 | 3/2005 | Konshak et al. |

(Continued)

FOREIGN PATENT DOCUMENTS

WO    2013120723 A1    8/2013

OTHER PUBLICATIONS https://youtu.be/oDAw7vW7H0c.

(Continued)

*Primary Examiner* — John J Lee
(74) *Attorney, Agent, or Firm* — Dority & Manning, P.A.

(57) ABSTRACT

A system for enabling RF communication of a modular mobile electronic device includes a set of antennas that enable RF communication of modules removably coupled to the modular mobile electronic device and an antenna control system, including an antenna routing system, wherein the antenna routing system controls electrical coupling between the set of antennas and the modular mobile electronic device, wherein the antenna tuning system is integrated into a chassis of the modular mobile electronic device.

20 Claims, 9 Drawing Sheets

(56) References Cited

U.S. PATENT DOCUMENTS

| | | |
|---|---|---|
| 7,458,815 B2 | 12/2008 | Fallah-Adl et al. |
| 7,509,094 B2 | 3/2009 | Moran et al. |
| 7,618,260 B2 | 11/2009 | Daniel et al. |
| 7,953,455 B2 | 5/2011 | Moran et al. |
| 8,154,244 B1 | 4/2012 | Gorham et al. |
| 8,180,395 B2 | 5/2012 | Moran et al. |
| 8,249,656 B2 | 8/2012 | Sherman et al. |
| 8,285,342 B2 | 10/2012 | Moran et al. |
| 8,509,848 B1 | 8/2013 | Cole |
| 2003/0118006 A1 | 6/2003 | Yang et al. |
| 2004/0212941 A1 | 10/2004 | Haas et al. |
| 2005/0017909 A1 | 1/2005 | Carpenter et al. |
| 2005/0101350 A1 | 5/2005 | Wang |
| 2005/0119029 A1 | 6/2005 | Kinney et al. |
| 2005/0190124 A1 | 9/2005 | Manabe |
| 2007/0099593 A1 | 5/2007 | Thome et al. |
| 2008/0028237 A1 | 1/2008 | Knight |
| 2008/0168282 A1 | 7/2008 | Brundridge |
| 2008/0197825 A1 | 8/2008 | Siri |
| 2008/0224769 A1 | 9/2008 | Markowski et al. |
| 2009/0009391 A1* | 1/2009 | Fox ............... H01Q 1/288 342/372 |
| 2009/0124288 A1 | 5/2009 | Song et al. |
| 2009/0167245 A1 | 7/2009 | Nguyen |
| 2009/0280865 A1 | 11/2009 | Danis et al. |
| 2010/0073202 A1 | 3/2010 | Mazed |
| 2010/0220432 A1 | 9/2010 | Wise et al. |
| 2010/0245184 A1 | 9/2010 | Talty et al. |
| 2010/0280637 A1* | 11/2010 | Cohn ............... G08B 29/02 700/90 |
| 2010/0302028 A1 | 12/2010 | Desai et al. |
| 2010/0323238 A1 | 12/2010 | Takahashi et al. |
| 2011/0157815 A1 | 6/2011 | Lin |
| 2011/0179405 A1 | 7/2011 | Dicks et al. |
| 2011/0205201 A1* | 8/2011 | Lorkowski ............... G06F 3/147 345/207 |
| 2011/0264944 A1 | 10/2011 | Newman |
| 2012/0293934 A1 | 11/2012 | Boduch et al. |
| 2013/0008707 A1 | 1/2013 | Kim |
| 2013/0026572 A1 | 1/2013 | Kawa et al. |
| 2013/0076572 A1 | 3/2013 | Lee et al. |
| 2013/0103212 A1 | 4/2013 | Andiappan |
| 2013/0154886 A1 | 6/2013 | Isohatala |
| 2013/0155600 A1 | 6/2013 | Ross et al. |
| 2014/0009980 A1 | 1/2014 | Divan et al. |
| 2014/0065982 A1 | 3/2014 | Suh et al. |

OTHER PUBLICATIONS

Bezooijen et al., "RF-MEMS Based Adaptive Antenna Machine Module" IEEE Radio Frequency Integrated Circuits Symposium, Honolulu, Hawaii, Jun. 3-5, 2007, pp. 573-576, http://alexandria.tue.nl/openaccess/Metis204228.pdf, retrieved on Mar. 29, 2010.

International Search Report from PCT/US2015/046594 mailed on Dec. 22, 2015—4 pages.

* cited by examiner

SYSTEMS AND METHODS FOR ENABLING RADIO-FREQUENCY COMMUNICATION OF A MODULAR MOBILE ELECTRONIC DEVICE

CROSS-REFERENCE TO RELATED APPLICATIONS

This application claims the benefit of U.S. Provisional Application No. 62/040,876, filed on 22 Aug. 2014, all of which is incorporated in its entirety by this reference.

TECHNICAL FIELD

This invention relates generally to the mobile electronics field, and more specifically to new and useful systems and methods for enabling radio-frequency (RF) communication of a modular mobile electronic device in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Modular mobile electronic devices may serve to meet user needs and preferences. Like all mobile electronic devices, if modular mobile electronic devices include systems for radio-frequency (RF) communication, said systems must be carefully designed and configured to achieve high signal transmission/reception quality. This design and configuration, as part of enabling RF communication, is especially difficult for modular mobile electronic devices because the RF properties of modular mobile electronic devices depend greatly on the configuration of the modular mobile electronic devices. Thus, there is a need in mobile electronics field to create systems and methods for enabling RF communication of a modular mobile electronic device. This invention provides such new and useful systems and methods.

DESCRIPTION OF THE INVENTION EMBODIMENTS

Figure 1:
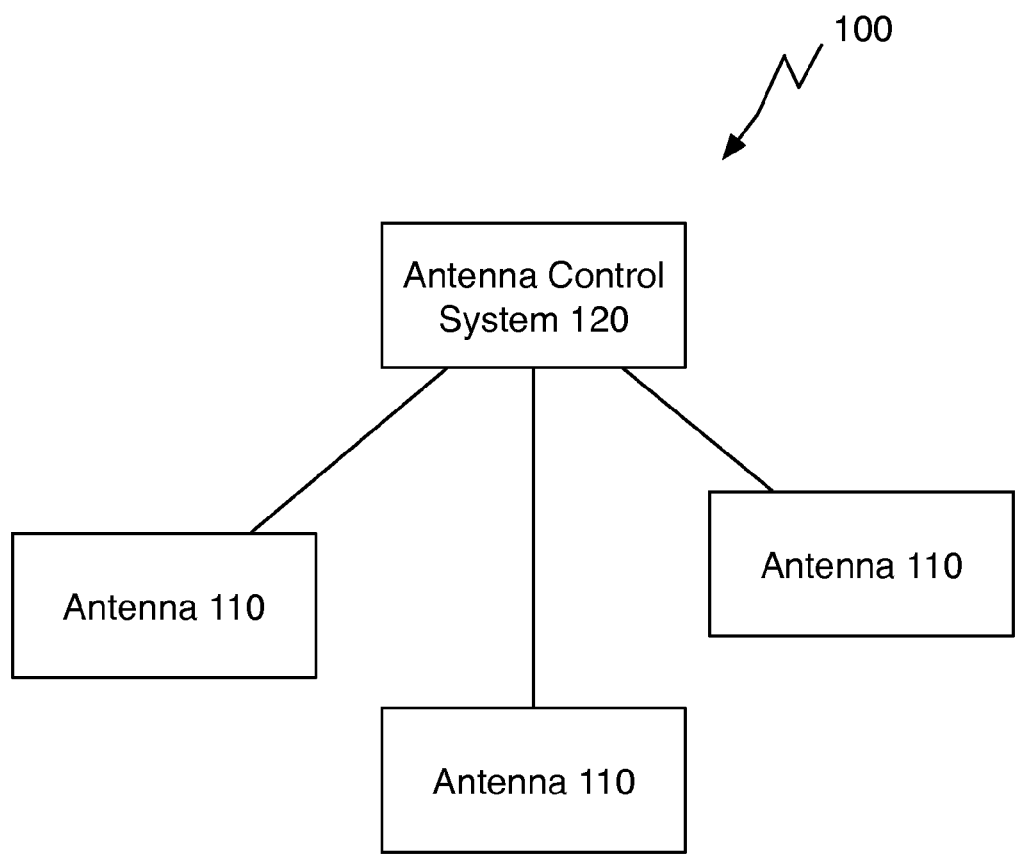
FIG. 1 is a diagram view of a system of an invention embodiment.

The following description of the invention embodiments of the invention is not intended to limit the invention to these invention embodiments, but rather to enable any person skilled in the art to make and use this invention.

A system and method for enabling RF communication of a modular mobile electronic device function to allow a modular mobile electronic device to configure RF communications parameters and/or components to achieve high communication quality. The system and method are preferably applied to modular mobile electronic devices for which modules can be used in different combinations and/or orientations. The high variability of such electronic architecture can create a highly dynamic and variable communication environment to which the system and method can preferably adapt.

Wireless communications are an important part of mobile electronic device operations. Almost all wireless communications standards are based on the transmission and reception of RF electromagnetic waves. Some examples of RF-based communications standards commonly used in mobile electronic devices include Wi-Fi, WiMax, Bluetooth, Zigbee, Cellular standards (e.g., GSM, CDMA, GPRS, EDGE, LTE), CB radio, AM radio, FM radio, NFC, and RFID.

Because of the nature of RF communication, RF communications systems for mobile electronic devices should be carefully designed and configured to achieve high signal quality. In particular, RF communication is particularly susceptible to interference issues; these susceptibilities may become more significant as antenna sizes shrink, antennas are placed in close proximity to one another, and/or antennas are placed in close proximity to objects that could absorb, reflect, and/or re-radiate RF fields. Designers of RF communications systems for mobile electronic devices typically deal with these issues by carefully designing and positioning antennas and power circuitry to take into account the static presence of other antennas, metal objects in the mobile electronic device (e.g. chassis), and user contact (e.g. where hands touch or cover antennas)—not a variable presence of antennas, physical components, and electronics.

Modular mobile electronic devices may include a wide variety of antennas (both in number and type) and may support many physical and electrical configurations. Therefore, RF communications systems for modular mobile electronic devices should be robust across a variety of modular mobile electronic device configurations. The systems and methods (hereafter described) for enabling radio-frequency (RF) communication of a modular mobile electronic device function to enable modular mobile electronic devices to communicate wirelessly with the internet and/or other electronic devices across a wide variety of modular mobile electronic device configurations.

Modular mobile electronic devices are preferably created and/or modified through the use of user-removable modules. When multiple modules are connected, the modules are preferably enabled in confederation to serve as a mobile electronic device. The mobile electronic device created by such a confederation is preferably characterized by the confederated modules as well as the parameters of confederation, which are preferably determined by the confederated modules and any system enabling the confederation of the modules. A modular mobile electronic device configured to serve as a smartphone is an example of a possible mobile electronic device. Other examples of possible mobile electronic devices include those configured to serve as tablets, laptops, media players, cameras, measurement devices, gaming systems, vehicular computing devices, set-top boxes, and televisions.

Modules are preferably user-removable and replaceable, enabling users to create mobile electronic devices with highly varied form and functionality. For example, a user may connect a camera module, a flash memory module, a processor module, a battery module, and a display module to a modular mobile electronic device to create a small and lightweight camera. The user could later add a cell-phone radio module and a microphone/speaker module to create a camera phone. Modules preferably follow an open and free standard, enabling almost anyone to be a module developer.

The flexibility afforded by module confederation preferably allows for a number of favorable outcomes. Users can purchase only the modules necessary for their needs, allowing for reductions in cost. Users can also choose to replace modules or add additional modules at a later time. In combination, these two outcomes may help increase accessibility to mobile electronic devices (and in many cases, the internet) throughout the world, especially for people for whom a smartphone or a PC is not currently a good value proposition. For example, a user may buy a system and a basic set of modules at a low price point, and transition to a more advanced phone by adding modules later on. These two outcomes may also help slow the creation of electronic waste by allowing mobile electronic devices to be upgraded or modified rather than replaced. Further, because modular mobile electronic devices are compatible with modules of highly varied form and function, and because modules are preferably based on an open standard, module confederation may allow small or specialized companies to make modules playing to their strengths without designing a full mobile electronic device.

Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include non-volatile flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD or OLED modules, non-touch graphical display modules, and e-ink display modules. Examples of power modules include battery modules, solar panel modules, and battery charging modules. The variety of modules preferably serve to provide various options and combinations of inputs, outputs, data storage, data processing, communication, power, and other suitable aspects of a computing device. Note that these example module types are in no way exhaustive or exclusive; i.e., modules may incorporate functionality from many of these example types or from none at all, and modules may additionally or alternatively incorporate suitable functionality not herein described.

The modules and modular mobile electronic devices are preferably those described in U.S. Provisional Application No. 61/976,173 and/or U.S. Provisional Application No. 61/976,195, which are incorporated in their entirety by this reference. The modules and modular mobile electronic devices may additionally or alternatively be any suitable modules and modular mobile electronic devices.

1. System for Enabling RF Communication

As shown in FIG. 1, a system 100 for enabling RF communication of a modular mobile electronic device includes antennas no and an antenna control system 120. The system 100 preferably includes a plurality of antennas 110, but may alternatively only include one antenna no. The system 100 preferably operates as part of the modular mobile electronic device, but may additionally or alternatively operate as part of any suitable system.

The system 100 enables RF communication of a modular mobile electronic device by providing antennas no, which allow for the reception and/or transmission of RF data. The system 100 preferably further enables high signal quality for the RF communication through the antenna control system 120, which adapts the properties of the antennas no and/or of signals received/transmitted by the antennas no to increase signal quality, taking into account modular mobile electronic device configuration.

The antennas no function to convert conducted electric power into RF waves and/or vice versa, enabling the transmission and/or reception of RF communication. The antennas no are preferably made out of a conductive material (e.g. metal). The antennas no may additionally or alternatively include dielectric materials to modify the properties of the antennas 110 or to provide mechanical support.

The antennas no may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The plurality of antennas no can additionally include one or more type of antennas, and the types of antennas can include any suitable variations.

The antenna 110 structure may be static or dynamic (e.g. a wire antenna that includes multiple sections that may be electrically connected or isolated depending on the state of the antenna).

The plurality of antennas 110 are preferably connected directly to transceivers with conductive wires, but may additionally or alternatively be connected to transceivers through any suitable method. In one variation of the invention embodiment, the antennas no are connected to transceivers through components of the antenna control system 120 (e.g. antenna switches and/or filters).

The antennas no are preferably connected to transceivers and/or the antenna control system 120 using fixed conductive wires, but may additionally or alternatively be connected to using a removable interface (e.g. through a plug and jack interface).

The antennas no may be located in a variety of locations, including at a module of a modular mobile electronic device, at the chassis of a modular mobile electronic device, and/or at any other suitable location.

Figure 2:
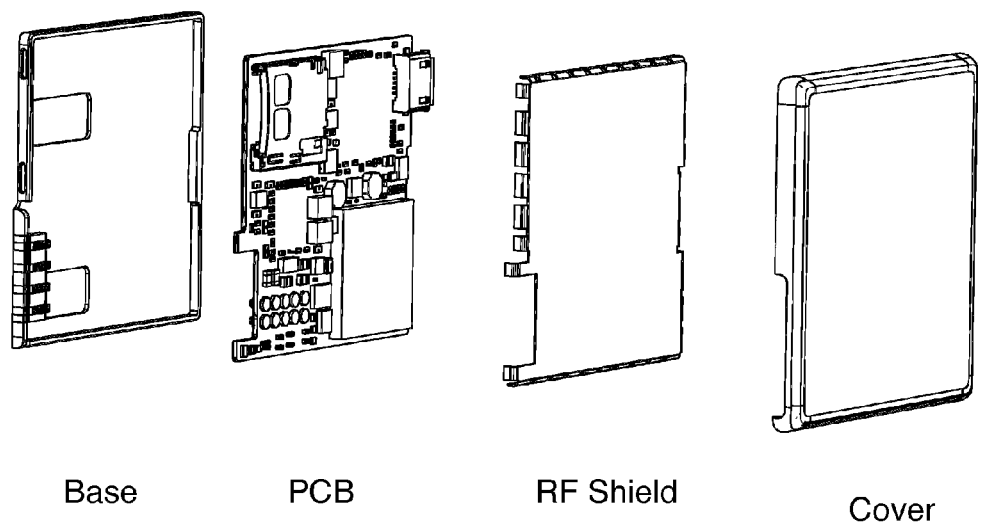
FIG. 2 is an exploded model view of a module.

An antenna no located at a module is preferably contained within the module and is connected to a transceiver also contained within the module. Additionally or alternatively, the module may include an antenna interface to allow connection of the antenna no to a transceiver not contained within the module and/or the antenna no located at a module may be located on a module or otherwise coupled to a module. An antenna 110 located within a module may be located at any position inside the module. An antenna 110 located at a module may be physically distinct from other parts of the module; or the antenna 110 may be integrated into other parts of the module. As shown in FIG. 2, an example module includes a module base, a module printed circuit board (PCB), a module RF shield, and a module cover. A physically distinct antenna no may be placed at the module in any suitable location; for example, a microstrip antenna no may be attached to the surface of the RF shield near the module cover. As another example, the antenna might be inserted into a corresponding slot on the module cover. Likewise, an integrated antenna no may be integrated into any suitable part of the module. In one example, an antenna no is integrated into the module base.

Figure 3:
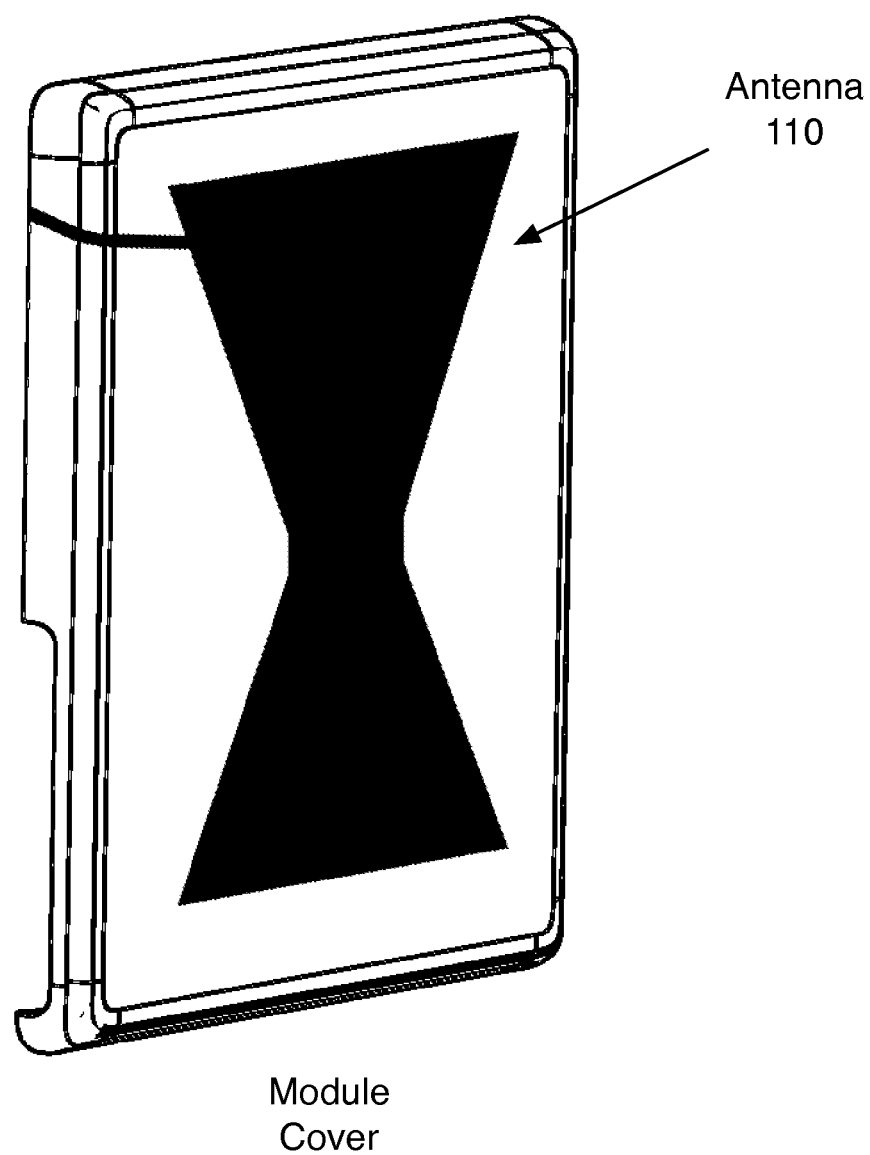
FIG. 3 is a model view of a module cover including an antenna of a system of an invention embodiment.

In one variation of the invention embodiment, the module cover is 3D printed. As shown in FIG. 3, the antenna no might be printed as part of the module cover. The antenna no may be exposed or may be covered by a dielectric material (which may be of any transparency and appearance). In this variation, the antenna no is preferably printed with a conductive material (or electroplated, etc.), while remaining parts of the module cover are printed using dielectric materials. Additionally or alternatively, the antenna no and the module cover may be printed using any suitable materials.

An antenna no located at the chassis of a modular mobile electronic device may be connected to transceivers in a variety of ways. For example, an antenna no located at the chassis may include an antenna interface that connects to a corresponding interface on a module, allowing the antenna to connect to a transceiver through the module (potentially a transceiver in the module).

Figure 4:
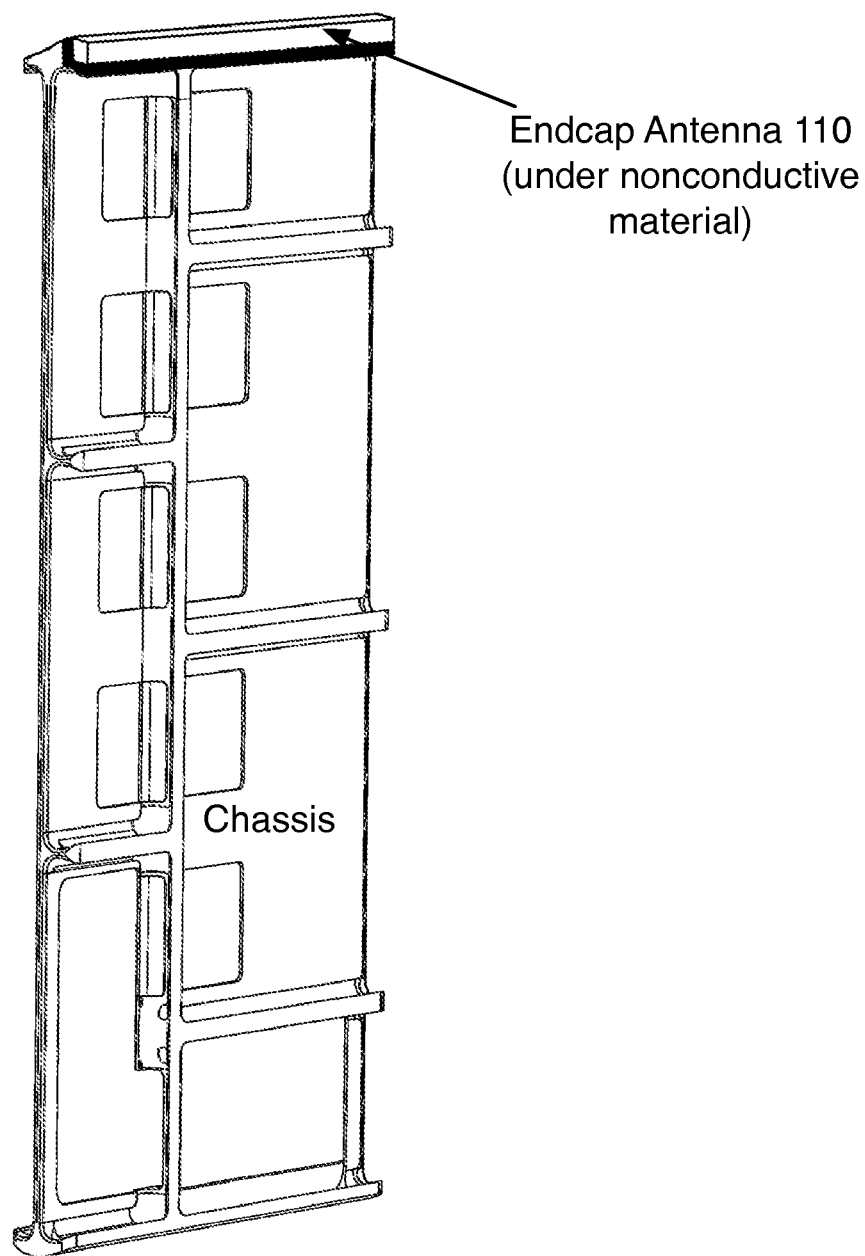
FIG. 4 is a model view of a modular mobile electronic device chassis including an antenna of a system of an invention embodiment.

As another example, an antenna 110 may connect to conductive wires contained within the chassis that allow for the antenna no to be connected to a transceiver in a module and/or in the chassis. In this example, the antenna 110 may connect directly to a transceiver or indirectly; e.g., through an antenna switch. Such an antenna no may be contained or coupled to any part of the chassis; for example, the antenna 110 may be contained within a non-conductive shell attached to the chassis (e.g., an endcap antenna), as shown in FIG. 4.

Figure 5:
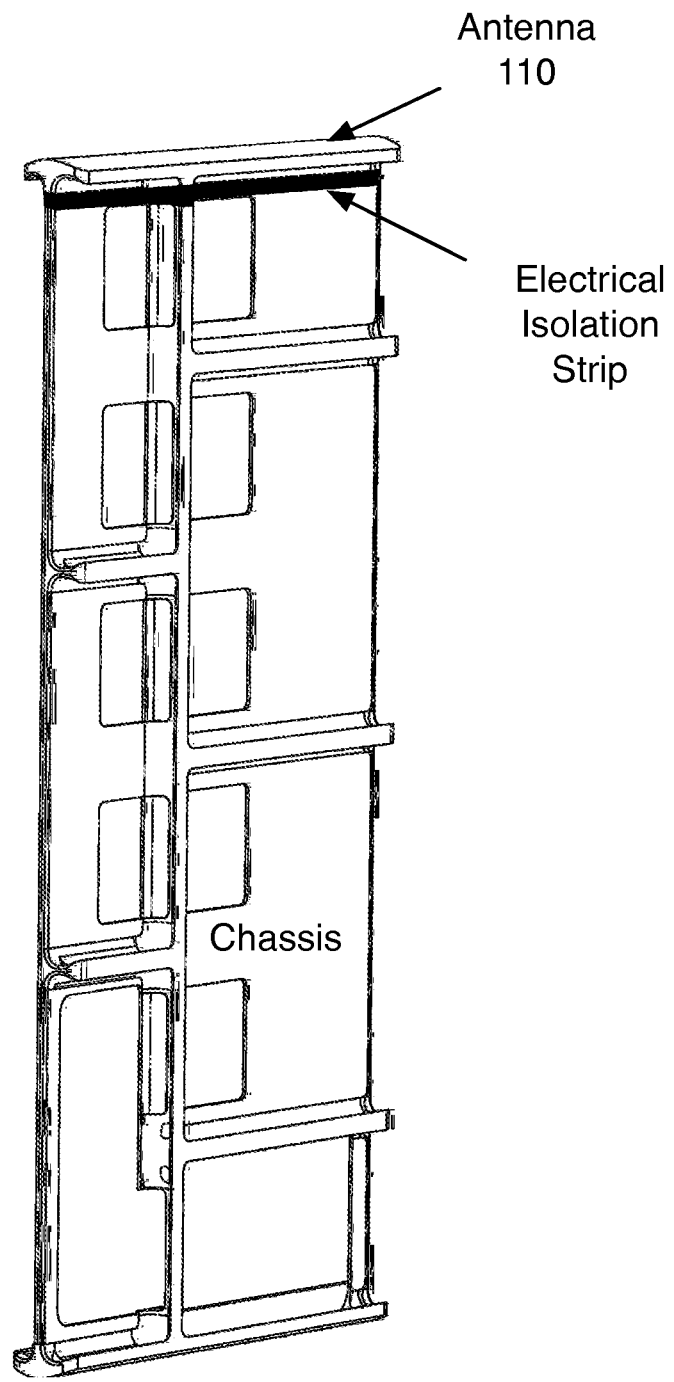
FIG. 5 is a model view of a modular mobile electronic device chassis including an antenna of a system of an invention embodiment.

As a third example, part of the chassis itself may serve as an antenna no. If the chassis or part of the chassis serves as an antenna no, the chassis may be modified to enhance antenna performance. As shown in FIG. 5, in one example, an antenna 110 is formed using one side of the chassis, which is electrically isolated from the rest of the chassis (which may serve as a ground, for instance).

The system 100 preferably includes a variety of antennas no. At least a subset of the antennas no can be attached to modules or can otherwise be removable from the modular mobile electronic device. Alternatively, all antennas no may be non-removable from the modular mobile electronic device.

The antennas no can be designed to communicate at frequencies of Wi-Fi, WiMax, Bluetooth, Zigbee, Cellular (e.g., GSM, CDMA, GPRS, EDGE, LTE), CB radio, AM radio, FM radio, NFC, and/or RFID communication, but may additionally or alternatively be designed to communicate at any suitable RF frequency. Antennas 110 may transmit/receive over a large frequency range (broadband) or a smaller frequency range (narrowband). Antennas 110 may have any impedance, may emit efficiently at any polarization, and may transmit/receive according to any suitable radiation pattern.

The antennas 110 of the system 100 preferably exhibit antenna diversity; e.g. they differ from each other in one or more of resonant frequency, bandwidth, gain, spatial position, antenna type, polarization, and radiation. Antenna diversity allows antennas 110 to enable transmission/reception for a variety of applications. In particular, the system 100 may include antennas 110 that have different resonant frequencies to allow for communication over different RF standards. The system 100 may also include antennas 110 that have the same resonant frequency, but are spaced apart, allowing the system 100 to compensate for multipath interference or to act as a multiple-in multiple out (MIMO) system.

Figure 6:
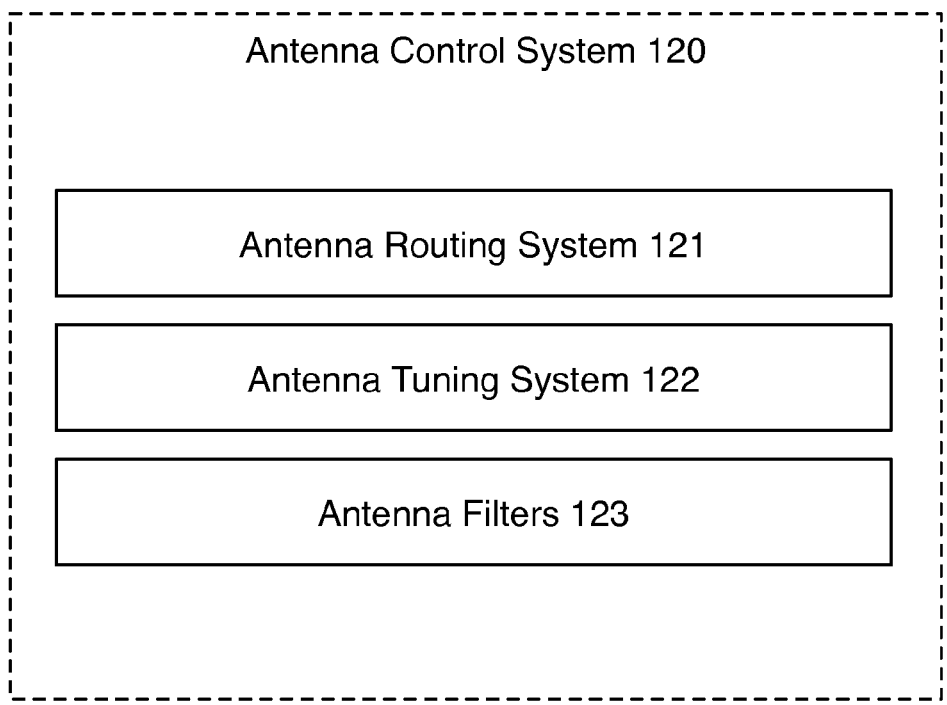
FIG. 6 is a diagram view of an antenna control system of a system of an invention embodiment.

The antenna control system 120 functions to control how antennas 110 interface with the system 100. The antenna control system 120 may control how antennas 110 interface with the system 100 in a variety of ways, including connecting/disconnecting antennas 110 to/from transceivers, routing signals to/from antennas 110 and/or transceivers, modifying signals received from/transmitted by antennas 110, and/or modifying the electrical properties (e.g. impedance) of antennas 110. As shown in FIG. 6, the antenna control system 120 may include antenna routing systems 121, antenna tuning systems 122, antenna filters 123.

Figure 7:
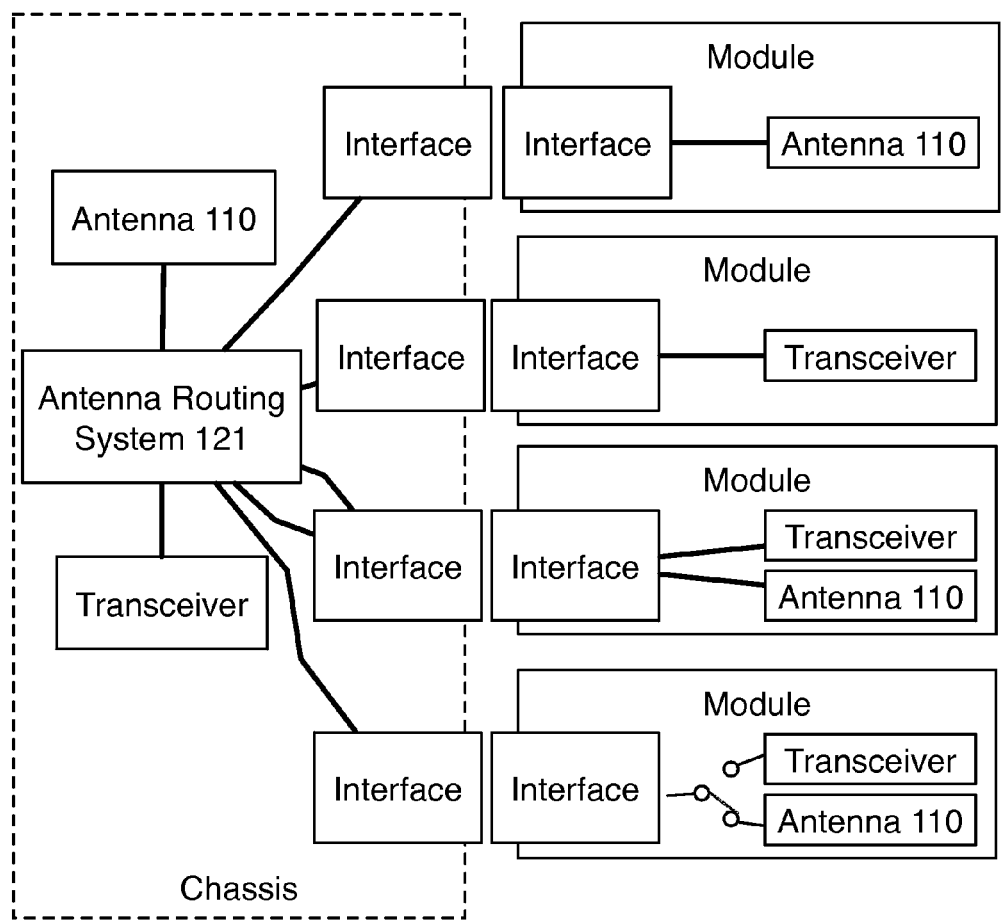
FIG. 7 is a diagram view of an antenna routing system of a system of an invention embodiment.

As shown in FIG. 7, antenna routing systems 121 function to route signals to/from antennas 110 from/to transceivers or other circuitry of a modular mobile electronic device. An antenna routing system 121 preferably includes an antenna switch that allows for antennas 110 to be electrically connected or electrically isolated from circuits of the modular mobile electronic device. Antennas 110 and/or transceivers may be hardwired to the antenna routing system 121 (or antenna routing systems 121), but the antennas 110 and/or transceivers may be removable from antenna routing system 121 (e.g. connected via plug and jack interfaces). Antennas 110 and transceivers in the same module may have separate interfaces or share interfaces to antenna routing systems 121. The antenna routing system 121 is preferably integrated into a chassis of a modular mobile electronic device, but may additionally or alternatively be integrated into a module or any other suitable location.

Figure 8:
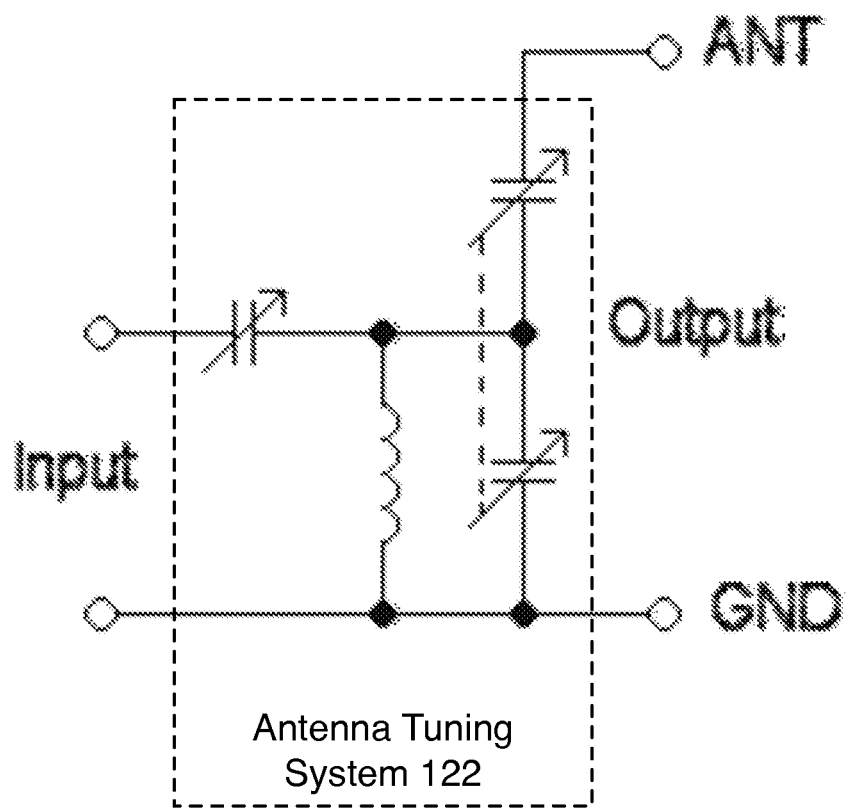
FIG. 8 is an example schematic view of an antenna tuning system of a system of an invention embodiment.

As shown in FIG. 8, an antenna tuning system 122 functions to modify the impedance of antennas 110 as seen by one or more other components of the modular mobile electronic device. By modifying the impedance of antennas 110, the antenna tuning systems 122 allow for the modification of antenna reception/transmission frequencies (i.e. the frequencies at which power transfer is high). The antenna tuning system 122 may connect to a single antenna 110 or to multiple antennas 110. Antenna tuning systems 122 also function to increase efficiency of resonant antenna reception at off-resonant frequencies. Antenna tuning systems 122 may include any suitable type of antenna tuning system, e.g., T networks, Pi networks, SPC networks, Z-match networks, and RF MEMS matching networks. Antenna tuning systems 122 are preferably co-located with antennas 110, but may additionally or alternatively be located in any suitable part of a modular mobile electronic device (e.g. a module, the chassis, etc.).

Antenna filters 123 function to filter signals received at/transmitted from antennas 110. Antenna filters 123 preferably filter out noise and/or undesired signals in antenna no signal paths. Antenna filters 123 preferably filter noise by suppressing undesired features or components of signals. Antenna filters 123 may be linear or non-linear, time invariant or time-variant, analog or digital, discrete-time (sampled) or continuous time, passive or active, infinite impulse response or finite impulse response, or any combination or subset of the previous. Antenna filters 123 may be electronic filters, digital filters, mechanical filters, distributed element fillers, waveguide filters, or any other suitable type of filters.

The antenna control system 120 may additionally or alternatively include software for controlling the antenna control system 120. Software for controlling the antenna control system 120 may be part of the antenna control system 120 or may be contained within any other suitable location; e.g. a module not containing the antenna control system 120 or a supervisory controller of a modular mobile electronic device. Software for controlling the antenna control system 120 preferably enables any controllable or configurable aspects of the antenna control system 120 to be controlled; additionally or alternatively, software may only enable a subset of controllable or configurable aspects of the antenna control system 120 to be controlled. For example, the antenna control system 120 might interact with software that controls antenna routing systems 121, directing antenna signals throughout a modular mobile electronic device.

Antenna control system software preferably directs antenna signal routing based on a modular mobile electronic device configuration state; the configuration state including details about module types (e.g., including presence and type of transceivers and/or antennas in the modules) and their locations (i.e., which interfaces the modules are connected to). If the chassis includes any antennas, the configuration state may additionally or alternatively include information about the chassis antennas.

For example, antenna control system software may be used to manage radiated emissions of a modular mobile electronic device to keep emissions in compliance with international emissions standards.

This configuration state may be used to automatically couple transceivers to appropriate antennas. For example, antenna control system software may detect that a 3G transceiver is located at a first interface coupled to the antenna routing system 121 and that a 3G antenna is located at a second interface coupled to the antenna routing system 121 and then automatically route signals between the transceiver and the antenna based on the information detected (e.g., contained within the configuration state).

2. Method for Enabling RF Communication

Figure 9:
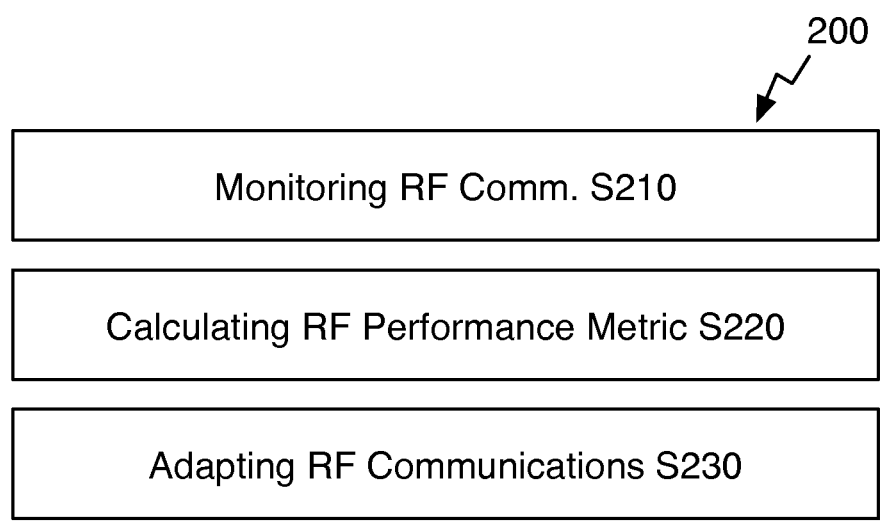
FIG. 9 is a diagram view of a method of an invention embodiment.

As shown in FIG. 9, a method 200 for enabling RF communication of a modular mobile electronic device includes monitoring RF communication S210, calculating an RF performance metric S220, and adapting RF communications based on the RF performance metric S230. The method 200 functions to allow a modular mobile electronic device to configure RF communications systems to achieve high communication quality. The method 200 preferably enables RF communications to increase communication quality in light of the particular context of use of a modular mobile electronic device; e.g., if a device depends significantly on Wi-Fi signals to create a good user experience and substantially less significantly on GPS signals, the method 200 may prioritize Wi-Fi communications quality over GPS communications quality. The method 200 preferably operates on an RF communications system substantially similar to the system 100, but may additionally or alternatively operate on any suitable system.

Step S210 includes monitoring RF communication. Step S210 functions to determine RF signal quality of an RF communications system; RF signal quality may include signal strength, noise, SNR, and/or any other parameters related to RF signal quality. For example, RF signal quality may include RF signal-related metrics like dropped packet counts.

If an RF communications system communicates using multiple communications standards, channels, and/or frequencies, monitoring RF communication S210 preferably includes monitoring RF communications for the complete set of standards, channels, and/or frequencies; additionally or alternatively, S210 may include monitoring only a subset of the complete set.

Monitoring RF communications S210 preferably includes monitoring RF communications using hardware of an RF communications system (e.g. measuring signal power at an antenna), but may additionally or alternatively include monitoring RF communications using any other suitable means. For example, Step S210 may include receiving data from another RF communications system on the signal transmitted by the first RF communications system. More specifically, Step S210 may include receiving at a cell phone antenna a transmission from the nearest cell tower containing data relating to the transmission power of the cell phone; this could be used to instruct the cell phone transceiver to increase or decrease transmit power. Monitoring RF communications S210 preferably includes monitoring RF communications over multiple antennas, but may additionally or alternatively include monitoring RF communications over a single antenna.

Monitoring RF communications S210 may additionally include storing, aggregating, analyzing, and/or otherwise processing data related to RF signal quality. For example, S210 may include averaging signal strength at a particular frequency for a particular antenna over ten second intervals.

Step S220 includes calculating an RF performance metric. Step S220 functions to provide a measure for how well an RF communication system is performing relative to expected performance. Calculating an RF performance metric S220 preferably includes calculating the RF performance metric based on data collected by Step S210, but may additionally or alternatively include calculating the RF performance metric based on any suitable data.

Calculating an RF performance metric S220 preferably includes calculating the RF performance metric based on RF communication context. RF communication context may include how an RF communications system is being used, to what extent various RF communication methods contribute to a user experience and/or to device performance, where an RF communications system is located, time, available power, historical data, manufacturer data, crowdsourced data, or any information relating to RF communication. Some examples of RF communication context data include: communication use by communication type (e.g. communication use for Wi-Fi, communication use for LTE, etc.), power use by communication type, communication channel use, signal strength by communication type, noise by communication type, communication use by time, historical data on communication use, historical data on signal strength, crowdsourced data on signal strength, historical/predictive/crowdsourced data on how a user interacts with the RF communications system, battery percentage remaining, location of nearby communication partners (e.g. cell towers, other devices), and device use context (e.g. what the device is being used for, such as taking pictures, making calls, etc.).

Calculating an RF performance metric S220 may additionally include evaluating the RF performance metric relative to a performance benchmark. The performance benchmark is preferably a context-dependent expected performance for the RF performance metric. The performance benchmark may be formed from historical data, RF communications models, manufacturer data, crowdsourced data, or any other suitable data. The performance benchmark is preferably used to determine if the calculated RF performance metric represents a good case scenario (e.g. one where RF performance is close to or exceeds expectations given context) or a bad case scenario (e.g. one where RF performance is not close to expectations given context). The RF performance metric and performance benchmark may both be used in adapting RF communications, as described in Step S230.

Step S230 includes adapting RF communications based on the RF performance metric. Step S230 functions to adapt RF communication systems parameters to improve RF communications system performance. RF communication systems performance may be measured based on one or more RF performance metrics calculated in Step S220 or in any other suitable manner (e.g. raw signal strength). Step S230 preferably includes determining RF communications adaptations by identifying known performance metric deficiencies (e.g., detecting that Wi-Fi signal strength is low compared to expected values) and correlating those deficiencies to known solutions (which may be known through past experimentation, through manufacturer data, through crowdsourced data, or through any other suitable source). Step 230 may additionally or alternatively include determining RF communications adaptations through any suitable method and/or using any suitable algorithm.

Step S230 preferably may adapt RF communications systems in a variety of ways, including adapting antenna properties, adapting transceiver properties, adapting signal processing, adapting communication type, adapting communication type priority, or with any other adaptations related to RF communications. For example, RF communications systems may be adapted through direct changes to an RF communications system; by changing antenna routing (e.g., disconnecting or connecting antennas from transceivers), changing signal type, changing signal frequency, changing signal phase, tuning an antenna tuning system, applying filters to signals, changing properties of filters, changing how signals from antennas are combined, changing transceiver power, and/or turning transceivers on or off. RF communications systems may also be adapted through indirect changes related to RF communications systems; for example, prioritizing communication using one communication protocol over communication using another at a processor; changing a data encoding; and/or redirecting power from a non-RF communication related system to an RF communication system. Step S230 may additionally or alternatively including notifying users of actions or configurations changes that may improve RF system performance. For example, the method 200 may include detecting that signal strength has diminished because of the way that a user is holding a phone, and suggesting that the user hold the phone in a different manner.

In another example, the method 200 operates on an RF communications system of a modular mobile electronic device. In this example, the method 200 includes detecting that two modules with RF transceivers are placed nearby each other, causing interference issue, and suggesting that a user reconfigure the module positioning. The module positioning may include directions to move two or more modules further apart, specific positioning of the modules, or a general recommendation to rearrange one or more module.

An alternative embodiment preferably implements the above methods in a computer-readable medium storing computer-readable instructions. The instructions are preferably executed by computer-executable components preferably integrated with a modular mobile electronic device or other devices with RF communications systems. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the embodiments of the invention without departing from the scope of this invention defined in the following claims.

We claim:

1. A system for enabling RF communication of a modular mobile electronic device comprising:
   a set of antennas that enable RF communication of modules removably coupled to the modular mobile electronic device; and
   an antenna control system, comprising an antenna routing system, wherein the antenna routing system controls electrical coupling between the set of antennas and the modular mobile electronic device, wherein the antenna routing system is integrated into a chassis of the modular mobile electronic device
   wherein the antenna routing system routes RF signals between a module transceiver and at least one of the set of antennas based on a configuration state of the modular mobile electronic device.

2. The system of claim 1, wherein the configuration state of the modular mobile electronic device includes information describing connections between the modules and interfaces of the antenna routing system and connections between the set of antennas and the antenna routing system.

3. The system of claim 1, wherein the set of antennas comprises a dynamic antenna, wherein properties of the dynamic antenna are adapted by the antenna control system in response to RF signal quality monitoring results.

4. The system of claim 1, wherein the set of antennas comprises a printed antenna, printed with conductive ink using a 3D printer.

5. The system of claim 4, wherein the printed antenna is printed as part of a module cover.

6. The system of claim 1, wherein the set of antennas comprises an antenna formed by a section of the chassis.

7. The system of claim 1, wherein the set of antennas comprises an endcap antenna coupled to the chassis.

8. The system of claim 1, wherein the antenna control system further comprises an antenna filter that filters out undesired signals from the set of antennas.

9. A method for enabling RF communication of a modular mobile electronic device comprising:
   monitoring RF communications of the modular mobile electronic device, wherein monitoring RF communications comprises storing RF signal quality data;
   calculating an RF performance metric based on the RF signal quality data; and
   adapting RF communications parameters based on the RF performance metric;
   wherein adapting RF communications properties comprises changing antenna routing.

10. The method of claim 9, wherein calculating the RF performance metric comprises calculating the RF performance metric based on at least one of:

data expressing to what extent various RF communication methods contribute to user experience;

data expressing to what extent various RF communication methods contribute to device performance;

comparisons of communication use across communication types; and comparisons of signal strength across communication types.

11. The method of claim 9, wherein calculating the RF performance metric comprises calculating the RF performance metric based on at least one of:

historical data on communication use;

historical data on signal strength; and historical data on user interaction with the modular mobile electronic device.

12. The method of claim 9, wherein calculating the RF performance metric comprises calculating the RF performance metric based on at least one of:

crowdsourced data on signal strength; and crowdsourced data on user interactions with modular mobile electronic devices similar to the modular mobile electronic device.

13. The method of claim 9, wherein adapting RF communications properties comprises tuning an antenna tuning system in response to detected de-tuning effects.

14. The method of claim 9, wherein adapting RF communications properties comprises redirecting power of the modular mobile electronic device to RF transmission from other tasks.

15. The method of claim 9, wherein adapting RF communications properties comprises notifying a user of the modular mobile electronic device of actions that may improve RF performance.

16. The method of claim 15, wherein notifying a user of the modular mobile electronic device of actions that may improve RF performance comprises suggesting that a user reposition one or more modules of the modular mobile electronic device.

17. The method of claim 15, wherein notifying a user of the modular mobile electronic device of actions that may improve RF performance comprises suggesting that a user hold the modular mobile electronic device in a particular manner.

18. A system for enabling RF communication of a modular mobile electronic device comprising:

a set of antennas that enable RF communication of modules removably coupled to the modular mobile electronic device; and an antenna control system, comprising an antenna routing system, wherein the antenna routing system controls electrical coupling between the set of antennas and the modular mobile electronic device, wherein the antenna routing system is integrated into a chassis of the modular mobile electronic device, and wherein the antenna control system further comprises an antenna tuning system that modifies impedances of the set of antennas.

19. The system of claim 18, wherein the antenna tuning system comprises an RF MEMS matching network.

20. The system of claim 18, wherein the antenna control system further comprises an antenna filter that filters out undesired signals from the set of antennas.

* * * * *